(12) United States Patent
Huergo et al.

(10) Patent No.: US 12,349,664 B2
(45) Date of Patent: Jul. 8, 2025

(54) FEEDER SENSOR

(71) Applicant: HORATECH, LLC, Dover, DE (US)

(72) Inventors: Horacio Luis Huergo, General Pacheco (AR); Gustavo Dario Listo, Chascomus (AR)

( * ) Notice: Subject to any disclaimer, the term of this patent is extended or adjusted under 35 U.S.C. 154(b) by 296 days.

(21) Appl. No.: 17/988,535

(22) Filed: Nov. 16, 2022

(65) Prior Publication Data

US 2024/0156054 A1    May 16, 2024

(51) Int. Cl.
*A01K 5/02*    (2006.01)
*A01K 29/00*    (2006.01)

(52) U.S. Cl.
CPC .......... *A01K 5/0291* (2013.01); *A01K 29/005* (2013.01)

(58) Field of Classification Search
USPC ............................................................ 73/491
See application file for complete search history.

(56) References Cited

U.S. PATENT DOCUMENTS

2020/0196568 A1*    6/2020    Robertson ............ A01K 5/0291

FOREIGN PATENT DOCUMENTS

| CN | 113163733 A | * | 7/2021 | ........... A01K 1/0209 |
| DE | 202011107005 U1 | * | 2/2012 | ............... A01K 5/01 |
| ES | 2744310 T3 | * | 2/2020 | ............... A01K 5/02 |

* cited by examiner

*Primary Examiner* — Clayton E. LaBalle
*Assistant Examiner* — Warren K Fenwick
(74) *Attorney, Agent, or Firm* — GOLAB INTELLECTUAL PROPERTY; Mario Sergio Golab

(57) ABSTRACT

The present invention discloses a device and a method to measure the level of food or water in a feedlot feeder. The device also provides a method for identifying an individual animal entering the feeder area and calculating the amount of food or water ingested. The device provides an alert for individual animals not feeding or drinking withing a predetermined period of time such that the identified animal may be evaluated for health or social interaction issues.

7 Claims, 3 Drawing Sheets

FEEDER SENSOR

FIELD OF INVENTION

The present invention is related to measuring and monitoring livestock feedlots levels. More specifically, the invention provides a novel device and method to remotely monitor and ensure that livestock feeders are always supplied with enough food and water such that the feeding cattle never goes hungry or thirsty and thus attain their maximum optimum weight naturally. The invention further provides a means and a method to identify an individual animal's social and health status.

BACKGROUND

To the best of our knowledge, this novel device is the first of its kind to be purposedly applied as a feeder's volume measurement device and animal behavior sensor.

While feeder's volume monitoring is a necessity of cattle fattening, current methods only involve in-situ visual observation through humans or drones, both of which must be carried out during the day and in reasonable weather.

Animal feeding and social patterns assessment are also tasks usually carried out by humans though in-situ observation.

Historically, humans have monitored feeder's volume level by visually assessing the feeder's capacity and replenishing it as needed. This is a labor-intensive operation that is carried out during the day and involves always monitoring 100% of the feeders, lest some feeders become empty and then force some livestock to go hungry.

Furthermore, monitoring a feeder's volume level is important because rain and livestock saliva can turn a feeder's content into mush and render it inedible by other animals.

Current monitoring methods, whether via humans or via drones, do monitor feeder's volume levels but do not monitor individual animals feeding levels, which for various social or health reasons may not be feeding sufficiently and thus go hungry, thirsty, sick, or all.

Feeders that are distributed on large tracks of land often can benefit from the use of surveillance drones. Drones can take photographs of the surveyed feeders by flying to various remote feedlot locations. These drone-captured images are processed, and their information is extracted to determine a feeder's volume status at different times of the day. A drone system used for monitoring feedlots is very expensive to operate, which makes it financially unfeasible for most livestock fattening businesses. Drone's images require an ex-post facto forensic analysis, since when the information is analyzed, the events have already occurred. It also requires the intervention of highly trained human drone-pilots to operate the flying devices.

Furthermore, the usage of drones has a random degree of rigor since it cannot establish a regimen of numerous readings, at successive times, in 100% of the feeders. Finally, inclement weather (wind, snow, rain, etc.) threatens the operation of these aerial devices.

The Inventors are not aware of other devices that have been applied to solve this specific unmet need.

BRIEF SUMMARY OF THE INVENTION

The current invention comes to solve several existing problems with the monitoring of a feeder's volume, such as the accurate measurement of its fill volume level, day and night continuous real-time feeder's volume monitoring, individual animal feeding intake monitoring, as well as all-weather monitoring. Discrete distribution of a plurality of these inventive devices on a feedlot provides accurate information to assess food distribution within a same feeder, which translates to better cattle accommodation at eating time, which correlates with less stress for the animals and thus translates into higher weight, faster fattening time, and higher feedlot rotation.

The novel device may also be used to monitor water levels in the drinking tanks and thus prevent cattle from going thirsty from lack of water.

The novel device provides an economical scalable solution for small and large feedlot operators alike and for any parcel with animal feeders.

The inventive device consists of a weather-resistant case with attaching means, such as brackets or screws, to an available external supporting structure, such as a pole or a wall.

The weather-resistant case contains a power supply, such as a long-lasting rechargeable battery, that may be optionally connected to an external electricity producing device such as a photovoltaic generator, an eolian generator, or similar electric power generating means, well known to a person of ordinary skill in the art. The power source being sufficient to supply all the novel device internal components' energy consumption needs for an extended period of time, exceeding one year.

The weather-resistant case also contains a central processing unit ("CPU"), powered by the power supply, that is capable of managing, monitoring, storing, communicating, and computing data gathered by its associated sensors. The CPU further controls all functions of the novel device, including, but not limited to, self-activation and disconnection, activation and operation of sensors, instruction of sensor's measurements, and processing and computing of sensors' measured data.

The innovative device incorporates at least one radiofrequency communications technology. The CPU is communicatively connected with one or more communications means capable bi-directionally wireless communications with other novel units, with remote monitoring devices, and with short-range wireless transmitters adhered to an individual animal.

The communications means are capable to operate throughout various protocols, known to any person of ordinary skill in the art such as, but not limited to, short-range wireless (0.1 ft to 60 ft), mid-range wireless (3 ft to 3,000 ft), and long-range wireless transmission technology standards (>1,500 ft). The declared communication ranges are for illustration purposes only as wireless communications technology development will expand and/or blur these limits. The communications transmission means may utilize one or more internal and/or external antennas.

Communication means include, but are not limited to, a plurality of radio frequencies, from the low frequency of AM radio (30 KHz>300 KHz), to very high frequency of FM radio (30 MHz>300 MHz), to ultra-high frequency used by TVs, GPS, and mobile phones (300 MHz>3,000 MHz), to super-high frequency used by satellite communications (3 GHz>30 GHz). Other communication means include infrared (an electromagnetic form of radiation), Bluetooth® (a technology owned by Bluetooth SIG), microwave, and satellite.

The communication means enable the novel device to exchange data utilizing short-range wireless protocols with nearby transmitters attached to individual animals.

The short-range wireless communication means also enables a nearby device to access the novel device, permits its activation or to shut it down, download data gathered by the sensors and processed by the CPU, and upload a program to the device's CPU.

The novel device also communicates via medium-range wireless protocol, utilizing a spectrum of radio frequency, with other sensors located on the same or adjacent feeders such that measurement data can be more accurately computed.

The novel device also has long-range wireless communications means to exchange data with remote transmitters/receivers. The long-range communication means include, but are not limited to, Radio Frequency, Cellular towers, Long Range Wide Area Network ("LPWAN") protocol, Worldwide Interoperability for Microwave Access ("WiMAX") protocol, satellite communication, and others well known to a person or ordinary skill in the art.

The novel device also contains at least one sensor to measure distance such as, but not limited to, radio frequency, ultrasound, laser, time-of-flight, and others well known to a person of ordinary skill in the art. The measured data is computed by the CPU to obtain the actual volume of food or water remaining in a feeder.

Livestock equipped with a short-range wireless transmitter is detected and identified upon entering the range of the novel device's short-range wireless communications receiver. Identifying individual animals is very important in order to ascertain whether they have been sufficiently fed and drunk enough water, and if not whether the absence of the animal detection close to a feeder is due to sickness of the animal or due to social issues with other animals.

The novel device also contains means to monitor and alert its unvoluntary removal such as, but not limited to, an accelerometer, an element in the circuit board communicatively connected to the CPU.

DETAILED DESCRIPTION OF THE INVENTION

Figure 1:
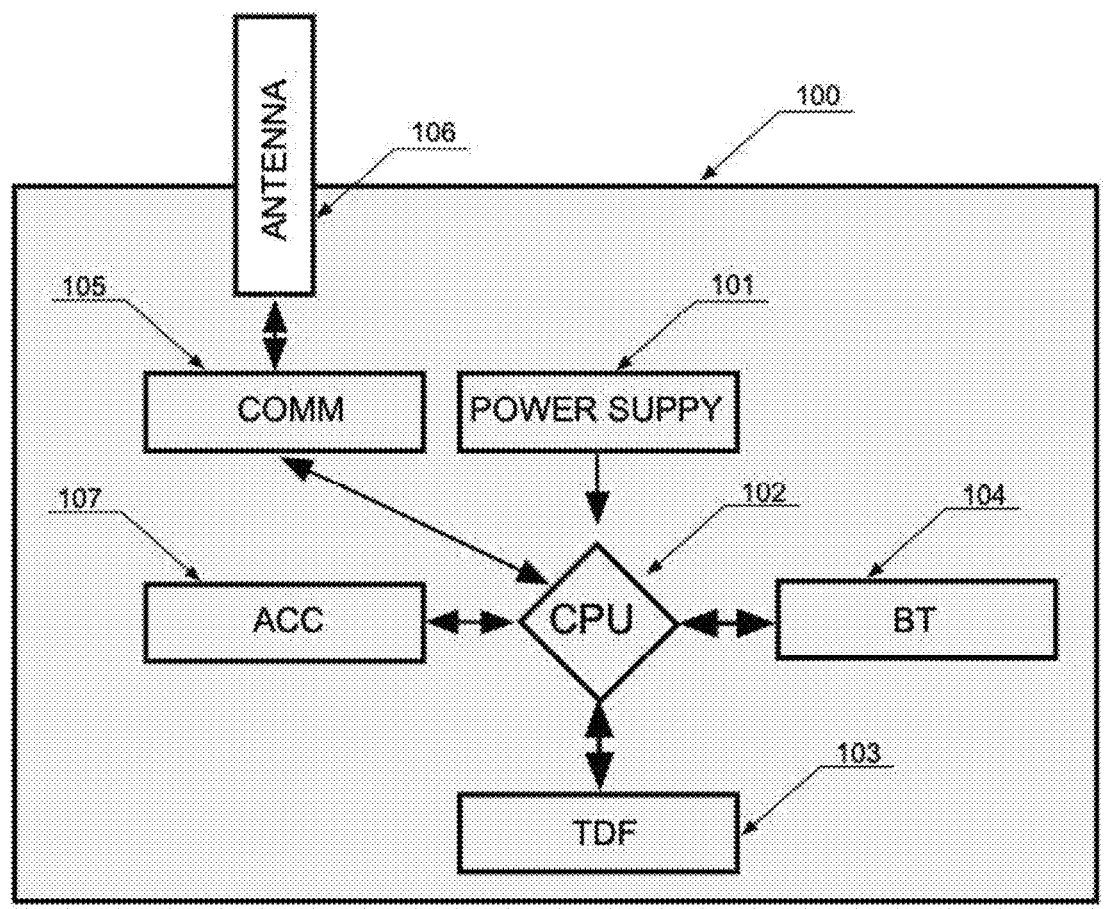
FIG. 1 shows a diagram of the novel device's internal components in a preferred embodiment of the present invention.

FIG. 1 exhibits a novel device comprising a weather-resistant case (100), that hosts and protects its internal components against external rain, sunlight, lightning, dust, and wind. The case (100) is normally disposed above a livestock feeder (not shown) or a water tank (not shown) and held up by attaching means (not shown) such as, but not limited to, brackets, screws, straps, and other attaching means, well known to a person of ordinary skill in the art, to an adjacent pole, beam, or wall.

The case (100) contains a power supply (101), such as a long-lasting battery, which itself may be recharged by a photovoltaic (not shown) and/or an eolian electricity generator (not shown). The power supply (101) provides all the energy needs of all the internal components hosted in the case (100) for periods of time exceeding one year.

The case (100) contains an electronic circuit board that comprises a CPU (102), capable of being programmed to receive and execute instructions, timing the instructions according to a pre-programmed protocol or varying it according to a self-learning algorithm, computing the data gathered by connected sensors, managing the device's internal components, monitoring the volume of the feeder or the water tank, alerting when a feeder's food or water levels exceed a predetermined upper and lower threshold, storing data collected by the device's sensors, and communicating with external devices by a plurality of wireless communications means.

The CPU is also being capable of bi-directional communications, via a communication unit (105) utilizing an internal or an external antenna (106), with various short, medium, and long-range wireless communication external devices.

A short-range wireless transmitter (not shown), attached to an animal, is used to detect whether and when the animal enters the novel device's short-range wireless receiver's (104) range. Upon entering said range, the animal is uniquely identified by its transmitter, the time the animal remains in the area can be established by the time the transmitter and receiver (104) remain connected. The connection time helps determine the amount of food or water the animal has ingested.

The failure of an animal to enter the range of the novel device's short-range wireless receiver (104) is indicative of an animal that has neither eaten nor drank from the respective feeders (not shown) in excess of a predetermined length of time considered prudent. At such a point, the novel device will issue an alert and warn a human operator who will be able to evaluate whether the animal did not eat or drink because it was sick or because of social issues with other animals, such as collision with another more dominant animal. In the first instance the animal can be evaluated by a veterinarian, in the second instance that animal can be moved to a different feeder to avoid the conflicting animal.

The CPU (102) operates a distance measuring sensor (103). The distance measuring sensor (103) is at least one selected from a group consisting of an ultrasonic sensor, a LASER operated apparatus such as, but not limited to, light detection and ranging, a video camera, a time-of-flight sensor, a luminous sensor, and an optical sensor; or others well known to a person of ordinary skill in the art.

The distance measuring sensor (103) determines the distance to the feeder's content level, top, i.e., full and bottom, i.e., empty. The novel device performs several successive readings within a short time interval. The CPU (102) excludes readings with an extreme result and averages the other measurements, thus obtaining a reliable result that is not affected by the various climatic and/or physical factors present in the different environments in which the measurement takes place. An extreme measurement generally derives from the obstruction caused by the head or body of a feeding/drinking animal positioned in between the device and the surface of the food or water in the feeder. Multiple, time-spaced, feeder measurements reduce the risk of erroneous calculations.

The data measured and collected by the novel device is then processed by the CPU (102) through a proprietary algorithm to determine the volume of food or water remaining in the feeder (not shown).

The distance measuring sensor (103) can be activated according to a pre-established protocol, discretely or continuously. The measurements of a plurality of devices placed on a same feeder can be used to calculate more precisely the volume of food remaining in the feeder as the distribution of solid food in the feeder is not even.

A plurality of novel devices on a same feeder permits a more accurate geolocation of an animal, through triangulation of their respective short-range wireless receiver (104) signals, The measurements collected from the feeder are then processed and stored in the CPU's (102) memory and transmitted to a remote location utilizing its long-range wireless communication unit (105).

The novel device also has the ability to issue alerts about unexpected events, including, but not limited to, the excess or total absence of food, the unintentional removal of a device from its location, the absence of a feeder. It also provides information about its own operating status and power supply level, thus providing a management tool to maintain the normal operation of the novel device under the various climatic and environmental conditions to which it is subjected.

The utilization of a plurality of devices on a single feeder provides a more accurate measurement of its volume level than the visual measurement of a human operator.

While this novel device functions are applied to measure the volume of feeders in a feedlot, nothing prevents other uses such as to measure the volume/level of garbage containers, liquid and semi liquid storage tanks, grain silos, etc.

Figure 2:
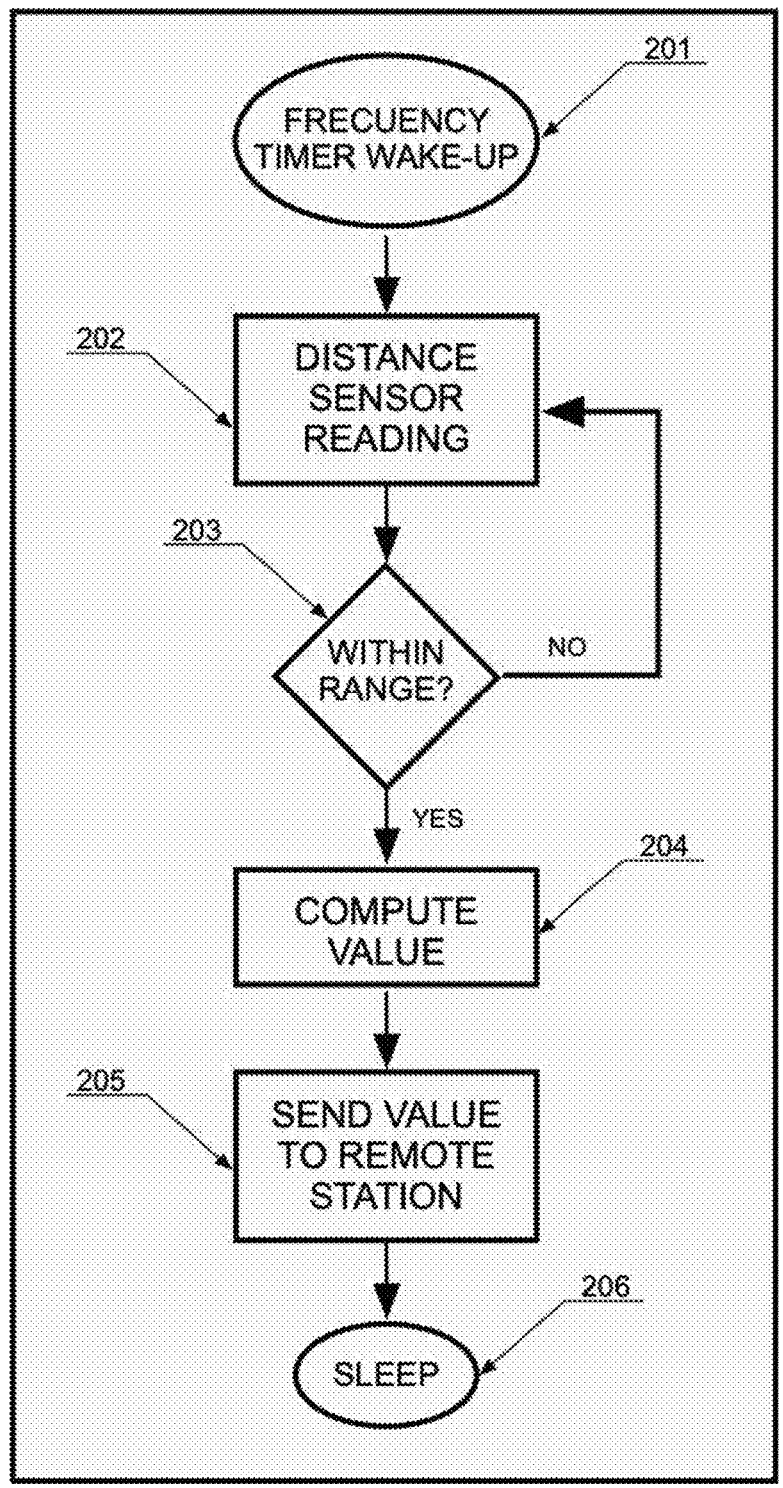
FIG. 2 shows a flowchart of a method for measuring the volume of food or drink in a feeder in the present invention.

FIG. 2 exhibits a flowchart of a method to determine the volume of food or drink left on a feeder. This value is the raison d'être of the invention. Not enough food or drink and the animals go hungry or worse, they die, defeating the objective of quickly increasing their weight in a feedlot. Too much food after a rain may indicate spoiled food, which is not desirable by the animal to feed upon, with the same adverse consequences.

Upon a predetermined time-interval, the novel device is activated (201) to initiate a measuring of the distance to the surface of the food in a feeder (202) or liquid in a tank.

The head of an animal may be interspersed on the path of the sensor and thus the measurement result obtained will need to be excluded for being out of a pre-established range (203). A valid measurement (204) corresponds to a value between the bottom and the top of the feeder where food or drink should be contained.

The distance reading sensor (103) is activated several times, to ensure that valid readings are captured, and during various times of the day/night, such that measurements are computed accurately by the CPU (102). The measurement value calculated is transmitted through a long-distance wireless protocol to a remote station (205). The device goes to operational sleep (206) until a future time when the process is repeated.

Figure 3:
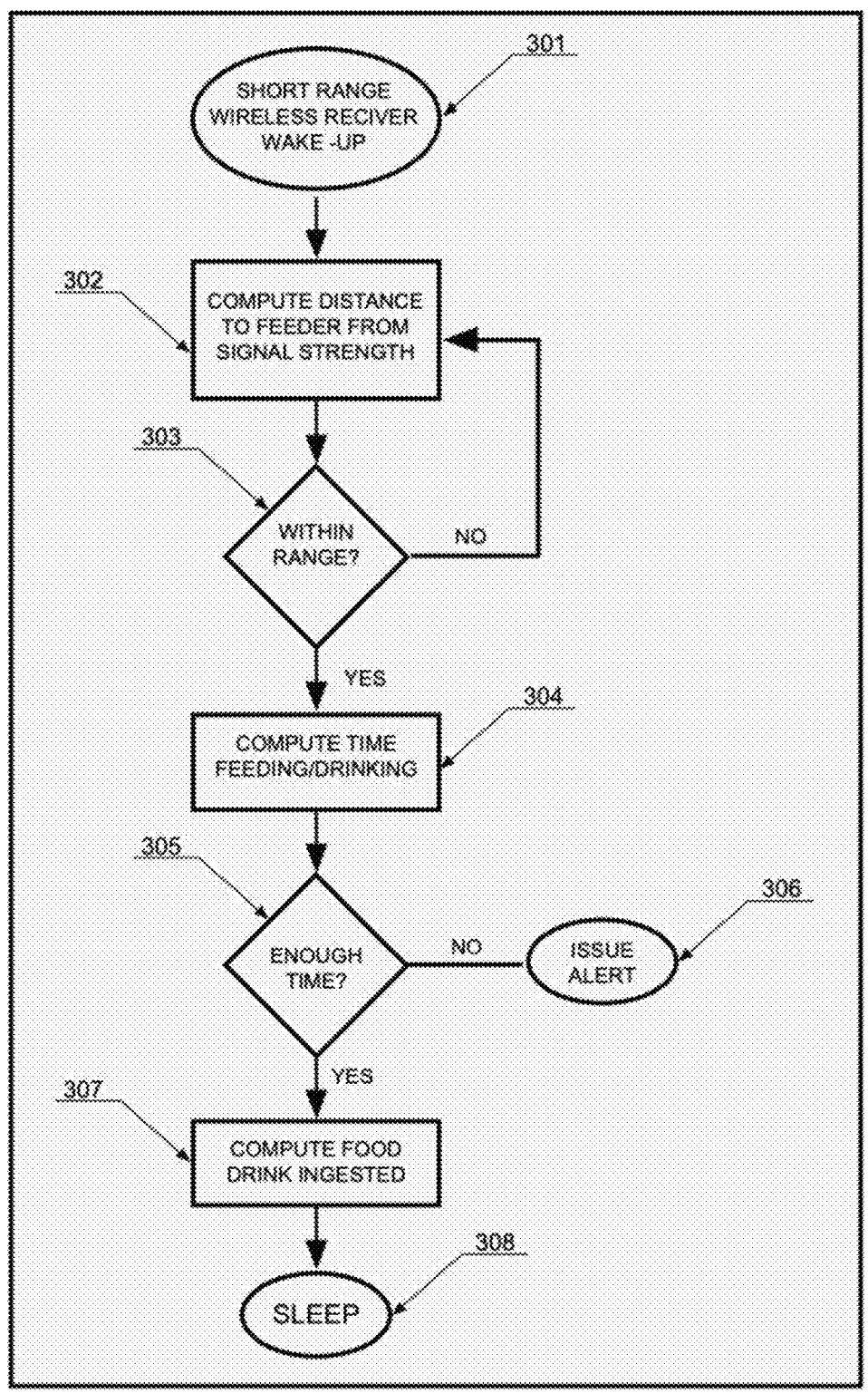
FIG. 3 shows a flowchart of a method to determine the quantity of food or drink ingested by an individual animal, and alerting for the lack thereof, in the present invention.

FIG. 3 exhibits a flowchart of a method to compute how much food or drink an individual animal has ingested.

When an animal, equipped with short-range wireless transmitter, approaches a feeder equipped with the novel device, the device's short-range wireless receiver (104) establishes communication between them (301).

The novel device measures the signal strength of the communication and computes the distance of the animal to the feeder (302).

If the computed distance (303) of the short-range transmitter corresponds to the animal's head at the feeder, then it is presumed that the animal is feeding/drinking. Then the time spent by the animal at this location is clocked (304) until the communication signal weakens and disappears indicating the animal has stopped feeding/drinking and it is moving away from the feeder.

If the time the animal is at a feeding/drinking location does not exceed beyond a predetermined threshold time (305), and this happens more than a desired number of times, then this animal may be embroiled in a social situation whereby a more dominant animal does not let this animal feed or drink. An alert (306) permits a human to review the situation and take the appropriate steps to solve the situation. Animals in social situations may go without food or drink and get sick or die, thus defeating the purpose of the feedlot, wasting resources, and causing financial losses.

If the time elapsed at the feeding/drinking location exceeds a predetermined threshold, then the animal is considered as feeding/drinking. The time at this location, the unique animal characteristics, the local weather at the time of measurement, and other factors well known to a person of ordinary skill in the art, are used in a proprietary algorithm to compute to the amount of food/drink ingested by the specific animal (307).

When the animal leaves the reception area of the short-range wireless receiver, the device goes to sleep (308).

The invention claimed is:

1. A device for measuring the volume of food or liquids in a feeder, the device comprising;
    a weather-resistant case with external fastening means, the case containing
    a power supply, communicatively connected to all components hosted within the case and capable of supplying all the components' energy needs;
    a central processing unit, capable of managing, monitoring, storing, processing, computing, timing, instructing, alerting, and communicating data with all components hosted within the case and with remote devices;
    a communications unit communicatively connected to the central processing unit, capable of transmitting and receiving data through short-range, medium-range, and long-range wireless communication means protocols;
    a distance measuring sensor communicatively connected to the central processing unit, capable of measuring the distance between itself and the the feeder's content's surface; and
    an accelerometer communicatively connected to the central processing unit, capable of detecting a forceful movement of the weather-resistant case and alerting, through the communications unit, a remote device about such forceful movement.

2. The power supply of claim 1, wherein the power supply is connected to an external source of energy that is at least one selected from a group consisting of a photovoltaic electricity generator, an eolian electricity generator, and an external supply of electricity.

3. The distance measuring sensor of claim 1, wherein the distance measuring sensor is at least one selected from a group consisting of an ultrasound sensor, a radio frequency sensor, a LASER operated sensor, a video camera, a time-of-flight sensor, a luminous sensor, and an optical sensor.

4. A method for measuring a feeder's volume level by a device capable of measuring distance and time, computing measurements, creating alerts, and communicating the measurement results and alerts to a remote station, the method comprising:
    the device selected is at least one selected from a group consisting of an ultrasonic sensor, a LASER operated apparatus such as, but not limited to, light detection and ranging, a time-of-flight sensor, a luminous sensor, and an optical sensor;

the device measuring distance to a feeder's content surface a plurality of times and upon a predetermined time-intervals;

the device computing and excluding measurement readings that are out of a range exceeding a predetermined maximum value, corresponding to an empty feeder, or less than a minimum value, corresponding to a full feeder;

the device computing a feeder's volume from a plurality of measurement readings not excluded; and the device communicating the computed feeder's volume to a remote station.

5. A method to determine if an animal, equipped with a short-range wireless transmitter is feeding or drinking from a feeder, by a device capable of measuring distance and time, computing distance from a transmission signal strength, communicating with a short-range wireless transmitter and with a remote station, the method comprising:

the device receiving a transmission from establishing communication with the animal's short-range wireless transmitter;

the device determining if the animal is at a feeder by computing the distance of the short-range wireless transmitter to the device from the transmission signal strength;

the device measuring the time elapsed at the feeder and comparing it to a predetermined minimum time for an animal to ingest food or drink;

the device measuring time in excess of the predetermined minimum time the animal remains in proximity to the feeder;

the device computing the amount of food or drink the animal ingested; and the device communicating to a remote station the amount of food or drink the animal ingested.

6. A method to determine if an animal, equipped with a short-range wireless transmitter, is having a health alert, by a device capable of measuring distance and time, computing distance from a transmission signal strength, communicating with a short-range wireless transmitter and with a remote station, the method comprising:

the device receiving a transmission from the animal's short-range wireless transmitter;

the device determining if the animal is at a feeder by computing the distance of the short-range wireless transmitter to the device from the transmission signal strength;

the device measuring the time elapsed at the feeder and comparing it to a predetermined minimum time for an animal to ingest food or drink;

the device measuring time in excess of the predetermined minimum time the animal remains in proximity to the feeder;

the device computing the amount of food or drink the animal ingested;

the device communicating to a remote station the amount of food or drink the animal ingested;

the device measuring an elapsed time the short-range wireless transmitter attached to the animal does not communicate with the device; and the device communicating a heath alert to a remote station should the elapsed time exceed a predetermined time for the animal to feed or drink.

7. A method to determine if an animal, equipped with a short-range wireless transmitter, is having a social alert, by a device capable of measuring distance and time, computing distance from a transmission signal strength, communicating with a short-range wireless transmitter and with a remote station, the method comprising:

the device receiving a transmission from the animal's short-range wireless transmitter;

the device determining if the animal is at a feeder by computing the distance of the short-range wireless transmitter to the device from the transmission signal strength;

the device measuring the time elapsed at the feeder and comparing it to a predetermined minimum time for an animal to ingest food or drink;

the device measuring time in excess of the predetermined minimum time the animal remains in proximity to the feeder;

the device computing the amount of food or drink the animal ingested;

the device communicating to a remote station the amount of food or drink the animal ingested;

the device measuring an elapsed time the short-range wireless transmitter attached to the animal time does communicate with the device; and the device communicating a social alert to a remote station should the elapsed time does not exceed a predetermined minimum time for the animal to feed or drink.

* * * * *